United States Patent [19]

Kunimatsu et al.

[11] 4,223,616
[45] Sep. 23, 1980

[54] SYSTEM FOR GENERATING STITCH PATTERN SIGNALS FOR ELECTRONIC SEWING MACHINE

[75] Inventors: Hiroshi Kunimatsu, Osaka; Kinji Tabata, Nara; Kiyoshi Koreeda, Fujiidera; Toshihiko Daido, Nara, all of Japan

[73] Assignees: Koyo Seiko Co. Limited; Koyo Machine Industries Co. Limited, both of Osaka, Japan

[21] Appl. No.: 944,986

[22] Filed: Sep. 22, 1978

[30] Foreign Application Priority Data

Dec. 12, 1977 [JP] Japan ................... 52/149614

[51] Int. Cl.² .............................................. D05B 3/02
[52] U.S. Cl. ................................................ 112/158 E
[58] Field of Search .......... 112/158 E, 121.11, 121.12; 318/567, 569

[56] References Cited

U.S. PATENT DOCUMENTS

| | | | |
|---|---|---|---|
| 4,086,862 | 5/1978 | Makabe et al. | 112/158 E |
| 4,108,091 | 8/1978 | Hedstrom | 112/158 E |
| 4,116,144 | 9/1978 | Tanimoto et al. | 112/158 E |
| 4,141,305 | 2/1979 | Takenoya et al. | 112/158 E |

Primary Examiner—Peter R. Nerbun
Attorney, Agent, or Firm—Ward, Lalos, Leeds, Keegan & Lett

[57] ABSTRACT

A system comprising a read-only memory storing output data relating to the stitching movement of the needle for a plurality of stitch patterns or to the feeding movement of the feed dog for the stitch patterns and order instructing data specifying the order in which the output data is to be read out, the output data and order instructing data being stored in the memory as divided into bight relating data and feed relating data, and an address unit including a bight register and a feed register. Based on the data read out from the memory with each advancement of the stitching and feeding timings alternately given in timed relation to the machine main shaft, the register stores the address data for the data to be read out with the next same stitching or feeding timing. When forming a stitch pattern such as a symmetric pattern which requires the use of data codes representing the same amount of movement, the same stored data is repeatedly read out according to the order instructing data.

8 Claims, 10 Drawing Figures

SYSTEM FOR GENERATING STITCH PATTERN SIGNALS FOR ELECTRONIC SEWING MACHINE

BACKGROUND OF THE INVENTION

The present invention relates to a system for generating stitch pattern signals for use in electronic sewing machines in which the information relating to the stitching needle movement and to the feeding dog movement and stored in a static memory is read out in timed relation to the rotation of the machine main shaft and fed to drive means for controlling the bight and feed to enable the machine to form stitch patterns.

Figure 1:
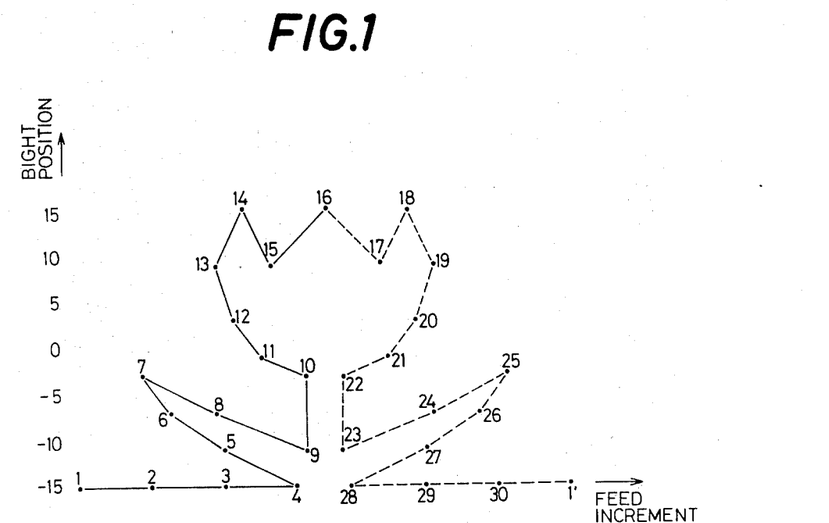
FIG. 1 is a diagram illustrating the order of stitches for forming a tulip pattern.

In recent years, sewing machines have been developed in which stitch pattern information is electronically stored in a memory to form stitch patterns without resorting to a mechanical cam device. For example, an electronic sewing machine is known in which a tremendous amount of stitch pattern information is stored in a read-only memory (ROM). Fabrication of such a read-only memory requires a cumbersome procedure of storing the required information in the correct order, so that the memory is not adapted for quantity production unlike other logical elements. For use as means for storing sewing machine stitch pattern information, different read-only memories must be prepared for the desired number of different patterns to be stored. Thus how to store the required information in a read-out memory of the smallest possible capacity is commercially most significant. The electronic sewing machine disclosed in Japanese Pat. Application Disclosure No. 37554/1975 includes such a read-only memory for storing stitch pattern information. For the formation of a stitch pattern, the read-only memory has stored therein the bight information for the needle and the feed information for the feed dog which are arranged as a pair in the order of stitch forming, such that the stored information is read out as arranged in the memory by addressing the memory with the output of a counter which counts as the machine shaft rotates. With the disclosed system, the pattern forming operation which was conventionally stored in a mechanical memory as with use of a cam or paper tape is similarly stored in the electronic memory merely substituted for the mechanical means. Stated another way, the electronic memory in such prior art systems is in reality little more than an electronic analogue of the mechanical memory in conventional mechanical cam controlled sewing machines. In such prior art electronic systems, the same amount of information must be stored in the memory, merely in another form, as is stored in the prior art mechanical memories. Thus the read-only memory is not so adapted as to store the required information with the smallest possible capacity. This will be described with reference to FIG. 1 showing a tulip pattern which is most frequently used as a symmetric sewing machine stitch pattern. The illustrated pattern is symmetrical with respect to the stitch No. 16. Table 1 below shows the bight position cordinate and feed increment for each stitch.

Table 1

| Stitch No. | Bight position cordinate | Feed increment | Stitch No. | Bight position cordinate | Feed increment |
|---|---|---|---|---|---|
| 1 | −15 | +8 | 16 | +15 | +6 |
| 2 | −15 | +8 | 17 | +9 | +3 |
| 3 | −15 | +8 | 18 | +15 | +3 |

Table 1-continued

| Stitch No. | Bight position cordinate | Feed increment | Stitch No. | Bight position cordinate | Feed increment |
|---|---|---|---|---|---|
| 4 | −15 | −8 | 19 | +9 | −2 |
| 5 | −11 | −6 | 20 | +3 | −3 |
| 6 | −7 | −3 | 21 | −1 | −5 |
| 7 | −3 | +8 | 22 | −3 | 0 |
| 8 | −7 | +10 | 23 | −11 | +10 |
| 9 | −11 | 0 | 24 | −7 | +8 |
| 10 | −3 | −5 | 25 | −3 | −3 |
| 11 | −1 | −3 | 26 | −7 | −6 |
| 12 | +3 | −2 | 27 | −11 | −8 |
| 13 | +9 | +3 | 28 | −15 | +8 |
| 14 | +15 | +3 | 29 | −15 | +8 |
| 15 | +9 | +6 | 30 | −15 | +8 |

It is seen that the bight data is symmetrical with respect to stitch No. 16, whereas with respect to the feed data, the data, for example, for stitch No. 17 next to No. 16 does not correspond to the data for No. 15 which is the first stitch before No. 16 but corresponds to the data for No. 14 which is the second stitch before No. 16. This is characteristic of the sewing operation of the machine by which stitches are formed by the alternation of the bight movement of the needle and the feed movement of the dog. The above-mentioned embodiment uses a system in which the combination of bight data and feed data for each stitch is prepared and the whole stitch pattern information is stored in ROM in the order of stitch formation. As far as this system is concerned, however, it is by no means possible to form a symmetrical pattern with a memory of reduced capacity in which only one half of the overall pattern information is stored, such that for the formation of the remaining half of the pattern, the stored information is read out in the reverse order. Thus the information of the whole stitch pattern must be stored.

Figure 2:
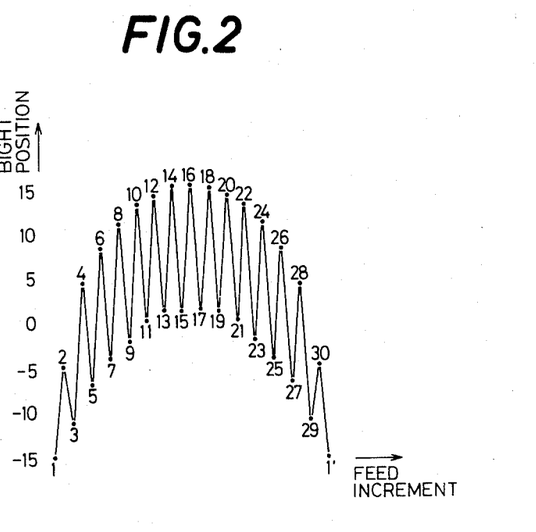
FIG. 2 is a diagram illustrating the order of stitches for forming a shell pattern.

This is also the case with the shell pattern shown in FIG. 2 which is similarly symmetrical with respect to the stitch No. 16. Table 2 shows the bight position cordinate and feed increment for each stitch of this pattern.

Table 2

| Stitch No. | Bight Position cordinate | Feed increment | Stitch No. | Bight position cordinate | Feed increment |
|---|---|---|---|---|---|
| 1 | −15 | +1 | 16 | +15 | +1 |
| 2 | −5 | +1 | 17 | +1 | +1 |
| 3 | −11 | +1 | 18 | +15 | +1 |
| 4 | +4 | +1 | 19 | +1 | +1 |
| 5 | −7 | +1 | 20 | +14 | +1 |
| 6 | +8 | +1 | 21 | 0 | +1 |
| 7 | −4 | +1 | 22 | +13 | +1 |
| 8 | +11 | +1 | 23 | −2 | +1 |
| 9 | −2 | +1 | 24 | +11 | +1 |
| 10 | +13 | +1 | 25 | −4 | +1 |
| 11 | 0 | +1 | 26 | +8 | +1 |
| 12 | +14 | +1 | 27 | −7 | +1 |
| 13 | +1 | +1 | 28 | +4 | +1 |
| 14 | +15 | +1 | 29 | −11 | +1 |
| 15 | +1 | +1 | 30 | −5 | +1 |

Storing the bight data and feed data of each stitch for the whole of such a pattern involves a great waste in the memory capacity because the feed data, which is of one kind, must be stored for all stitches.

Figure 3:
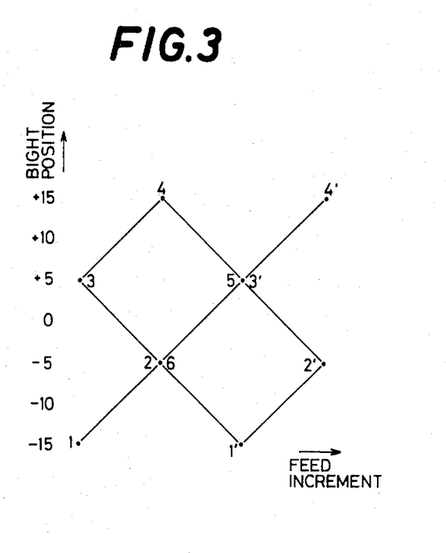
FIG. 3 is a diagram illustrating the stitch order for forming a smocking stitch.
Figure 4:
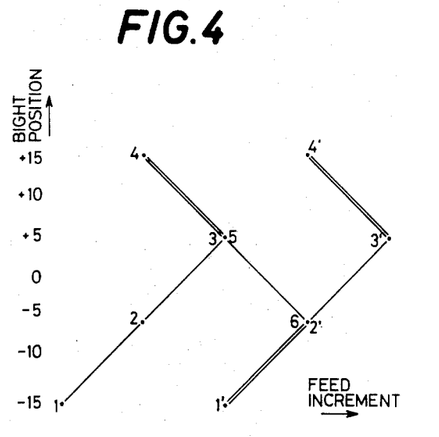
FIG. 4 is a diagram illustrating the stitch order for forming a feather stitch.

Furthermore, the smocking stitch shown in FIG. 3 and the feather stitch shown in FIG. 4 involve the bight position cordinates and feed increments given in Table 3 and Table 4 respectively.

| Table 3 | | | Table 4 | | |
|---|---|---|---|---|---|
| Stitch No. | Bight position cordinate | Feed increment | Stitch No. | Bight position cordinate | Feed increment |
| 1 | −15 | +10 | 1 | −15 | +10 |
| 2 | −5 | −10 | 2 | −5 | +10 |
| 3 | +5 | +10 | 3 | +5 | −10 |
| 4 | +15 | +10 | 4 | +15 | +10 |
| 5 | +5 | −10 | 5 | +5 | +10 |
| 6 | −5 | +10 | 6 | −5 | −10 |
| 1' | −15 | +10 | 1' | −15 | +10 |
| 2' | −5 | −10 | 2' | −5 | +10 |
| : | : | : | : | : | : |
| : | : | : | : | : | : |

Figure 5:
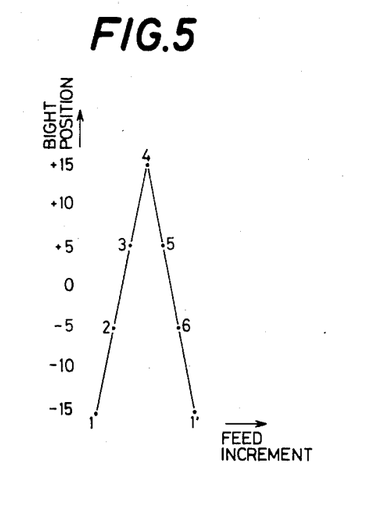
FIG. 5 is a diagram illustrating the stitch order for forming a mending stitch.
Figure 6:
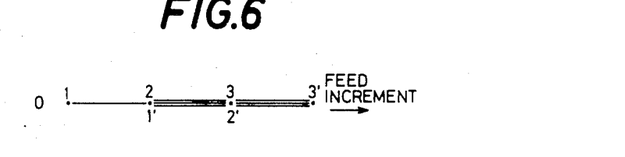
FIG. 6 is a diagram illustrating the stitch order for forming a stretch stitch.

These tables indicate that the above-mentioned stitches are provided by a combination of the bight data for the mending stitch shown in FIG. 5 and the feed data for the stretch stitch shown in FIG. 6. Tables 5 and 6 show bight position coordinates and feed increments for the mending stitch and stretch stitch which are very fundamental.

| Table 5 | | | Table 6 | | |
|---|---|---|---|---|---|
| Stitch No. | Bight position cordinate | Feed increment | Stitch No. | Bight position cordinate | Feed increment |
| 1 | −15 | +2 | 1 | 0 | +10 |
| 2 | −5 | +2 | 2 | 0 | +10 |
| 3 | +5 | +2 | 3 | 0 | −10 |
| 4 | +15 | +2 | 1' | 0 | +10 |
| 5 | +5 | +2 | 2' | 0 | +10 |
| 6 | −5 | +2 | 12 3' | 0 | −10 |

Thus the smocking stitch or feather stitch is provided by the combination of the bight data given in Table 5 (namely: −15, −5, +5, +15, +5, −5) and the feed data (+10, +10, −10) given in Table 6. Even in these cases, nevertheless, the conventional memory system requires that the pattern information for each stitch pattern be stored. It therefore follows that the inefficient use of memory capacity increases with the increase in the number of kinds of patterns.

SUMMARY OF THE INVENTION

An object of this invention is to provide a system for generating stitch pattern signals for use in electronic sewing machines in which the bight data and feed data for each stitch are not stored as combined data but are stored separately, such that the bight information or feed information comprises output data relating to the bight or feed and order instructing data specifying the order in which the output data is to be read out. Thus the bight information and the feed information for forming a specified stitch pattern can be read out in the predetermined order in time relation to the bight and feed movements. Accordingly the stitch pattern forming information can be stored in a read-only memory of exceedingly smaller capacity than in conventional electronic sewing machines.

DESCRIPTION OF THE PREFERRED EMBODIMENTS

Figure 7:
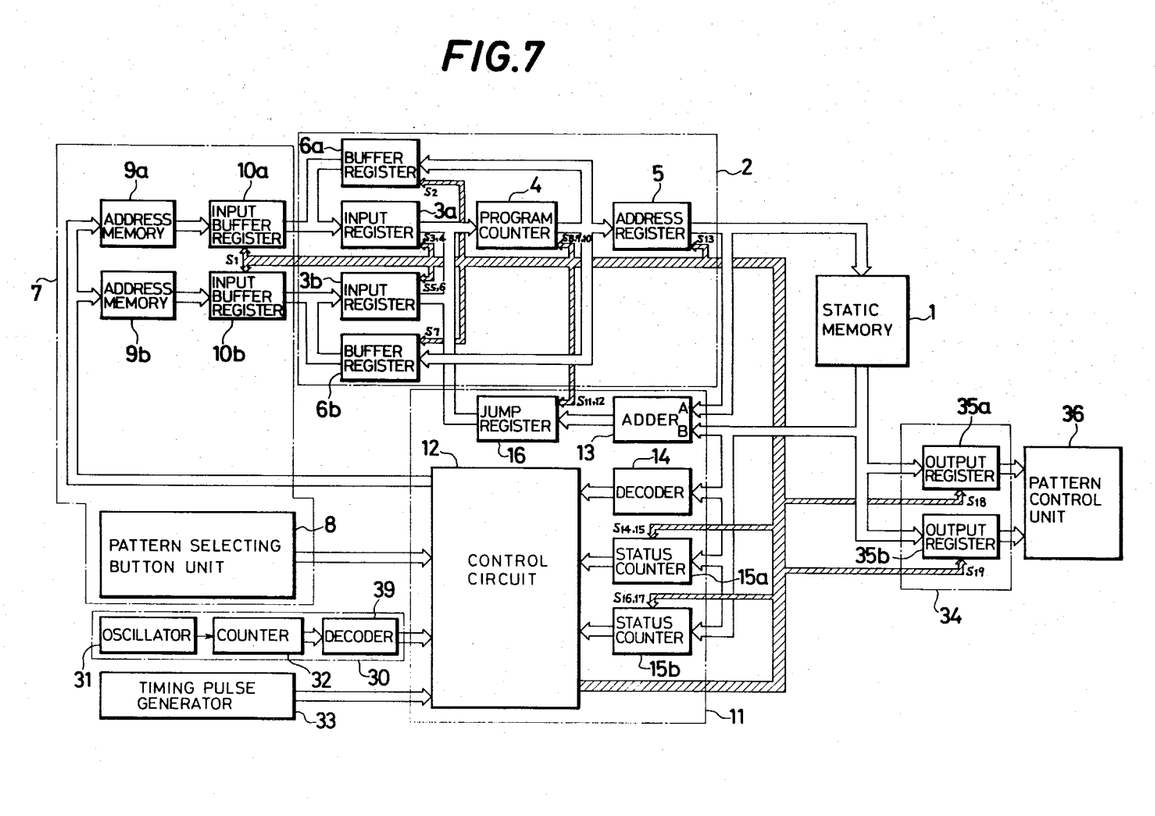
FIG. 7 is a block diagram showing an embodiment of this invention.

An embodiment will be described below. FIG. 7 shows a static memory comprising a read-only memory (ROM) 1 for storing information for several kinds of stitch patterns including a straight stitch. The pattern information does not comprise the combination of bight data and feed data but comprises output data and order instruction data. The output data comprises independent pieces of bight data specifying the displacement of the needle or feed data specifying the feed for the feeding dog. The order instructing data relates only to control instruction on the output order of the output data and does not contain the data relating to the displacement of the needle or feed of the feeding dog. According to the present embodiment, one piece of data is composed of 8 bits. The 3-bit portion of the output data in the higher or upper position is (000), which indicates that the data is output data, the remaining portion, namely the lower 5 bits being data relating to the displacement of the needle or the feed of the dog. The upper 3-bit portion of the order instruction data is (010), (011), (101) or (110), each indicating different order instruction, the remaining lower 5-bit portion being auxiliary data attendant on the particular order instruction. Detailed description will be given later. Examples of the information are given in the right column of Table 7 below. The address data for the information is shown in the left column of the table.

Table 7

| No. | Address data | Stored data | Stitch pattern |
|---|---|---|---|
| 1 | 0000000 | 00000000 | Bight for straight stitch |
| 2 | 0000001 | 01011111 | and stretch stitch |
| 3 | 0000010 | 00001111 | Bight for zigzag stitch |
| 4 | 0000011 | 00011111 | |
| 5 | 0000100 | 01011110 | |
| 6 | 0000101 | 01100010 | Bight for mending, feather |
| 7 | 0000110 | 00001111 | and smocking stitches |
| 8 | 0000111 | 00000101 | |
| 9 | 0001000 | 00010101 | |
| 10 | 0001001 | 01111110 | |
| 11 | 0001010 | 00001111 | Bight for blind stitch |
| 12 | 0001011 | 11000111 | |
| 13 | 0001100 | 00011111 | |
| 14 | 0001101 | 10111111 | |
| 15 | 0001110 | 01011100 | |
| 16 | 0001111 | 11000011 | Bight for buttonhole stitch |
| 17 | 0010000 | 00001100 | No. 1 |
| 18 | 0010001 | 00011100 | |
| 19 | 0010010 | 10111110 | |
| 20 | 0010011 | 00001100 | |
| 21 | 0010100 | 00000010 | |
| 22 | 0010101 | 01011110 | |
| 23 | 0010110 | 11000011 | Bight for buttonhole stitch |
| 24 | 0010111 | 00011100 | No. 2 |
| 25 | 0011000 | 00001100 | |

Table 7-continued

| No. | Address data | Stored data | Stitch pattern |
|---|---|---|---|
| 26 | 0011001 | 10111110 | |
| 27 | 0011010 | 00011100 | |
| 28 | 0011011 | 00010010 | |
| 29 | 0011100 | 01011110 | |
| 30 | 0011101 | 00011111 | Bight for hemstitch |
| 31 | 0011110 | 11000101 | |
| 32 | 0011111 | 00001111 | |
| 33 | 0100000 | 10111111 | |
| 34 | 0100001 | 01011100 | |
| 35 | 0100010 | 01100010 | Bight for shell pattern |
| 36 | 0100011 | 00001111 | |
| 37 | 0100100 | 00000101 | |
| 38 | 0100101 | 00001011 | |
| 39 | 0100110 | 00010100 | |
| 40 | 0100111 | 00000111 | |
| 41 | 0101000 | 00011000 | |
| 42 | 0101001 | 00000100 | |
| 43 | 0101010 | 00011011 | |
| 44 | 0101011 | 00000010 | |
| 45 | 0101100 | 00011101 | |
| 46 | 0101101 | 00000000 | |
| 47 | 0101110 | 00011110 | |
| 48 | 0101111 | 00010001 | |
| 49 | 0110000 | 00011111 | |
| 50 | 0110001 | 00010001 | |
| 51 | 0110010 | 00011111 | |
| 52 | 0110011 | 01111110 | |
| 53 | 0110100 | 01101010 | Bight for satin stitch pattern |
| 54 | 0110101 | 00001111 | |
| 55 | 0110110 | 00000101 | |
| 56 | 0110111 | 00001111 | |
| 57 | 0111000 | 01111110 | |
| 58 | 0111001 | 01111100 | |
| 59 | 0111010 | 00000101 | |
| 60 | 0111011 | 00010101 | |
| 61 | 0111100 | 00000101 | |
| 62 | 0111101 | 00010101 | |
| 63 | 0111110 | 00000101 | |
| 64 | 0111111 | 00010101 | |
| 65 | 1000000 | 00000101 | |
| 66 | 1000001 | 00010101 | |
| 67 | 1000010 | 00011111 | |
| 68 | 1000011 | 00010101 | |
| 69 | 1000100 | 00011111 | |
| 70 | 1000101 | 01111110 | |
| 71 | 1000110 | 01100010 | Bight for tulip pattern |
| 72 | 1000111 | 00001111 | |
| 73 | 1001000 | 00001111 | |
| 74 | 1001001 | 00001111 | |
| 75 | 1001010 | 00001111 | |
| 76 | 1001011 | 00001011 | |
| 77 | 1001100 | 00000111 | |
| 78 | 1001101 | 00000011 | |
| 79 | 1001110 | 00000111 | |
| 80 | 1001111 | 00001011 | |
| 81 | 1010000 | 00000011 | |
| 82 | 1010001 | 00000001 | |
| 83 | 1010010 | 00010011 | |
| 84 | 1010011 | 00011001 | |
| 85 | 1010100 | 00011111 | |
| 86 | 1010101 | 00011001 | |
| 87 | 1010110 | 00011111 | |
| 88 | 1010111 | 01111110 | |
| 89 | 1011000 | 00011001 | Feed for straight stitch and zigzag stitch |
| 90 | 1011001 | 01011111 | |
| 91 | 1011010 | 00010010 | Feed for mending stitch |
| 92 | 1011011 | 01011111 | |
| 93 | 1011100 | 00011000 | Feed for blind stitch |
| 94 | 1011101 | 01011111 | |
| 95 | 1011110 | 00000000 | Feed for buttonhole stitch No. 1 |
| 96 | 1011111 | 00010001 | |
| 97 | 1100000 | 01011110 | |
| 98 | 1100001 | 00000000 | Feed for buttonhole stitch No. 2 |
| 99 | 1100010 | 00000001 | |
| 100 | 1100011 | 01011110 | |
| 101 | 1100100 | 00011010 | Feed for stretch stitch |
| 102 | 1100101 | 00011010 | |
| 103 | 1100110 | 00001010 | |
| 104 | 1100111 | 01011101 | |
| 105 | 1101000 | 00010001 | Feed for shell pattern and |
| 106 | 1101001 | 01011111 | satin stitch pattern |
| 107 | 1101010 | 01100001 | Feed for tulip pattern |
| 108 | 1101011 | 00011000 | |
| 109 | 1101100 | 00011000 | |
| 110 | 1101101 | 00011000 | |
| 111 | 1101110 | 00001000 | |
| 112 | 1101111 | 00000110 | |
| 113 | 1110000 | 00000011 | |
| 114 | 1110001 | 00011000 | |
| 115 | 1110010 | 00011010 | |
| 116 | 1110011 | 00000000 | |
| 117 | 1110100 | 00000101 | |
| 118 | 1110101 | 00000011 | |
| 119 | 1110110 | 00000010 | |
| 120 | 1110111 | 00010011 | |
| 121 | 1111000 | 00010011 | |
| 122 | 1111001 | 00010110 | |
| 123 | 1111010 | 01111111 | |

With reference to FIG. 7, an address unit 2 receives an address signal from the pattern selecting unit 7 or control unit 11 to be described below to address a specified piece of information stored in the static memory 1. The address unit 2 includes input registers 3a and 3b for temporarily storing the bight head address signal and feed head address signal for the specified pattern information from the pattern selecting unit 7. The address unit 2 further includes a program counter 4 for temporarily storing the address signal from the input register 3a or 3b or from a jump register 16 included in the control unit 11 and transferring the signal to the next address register 5. The program counter 4 further adds 1 to or subtracts 1 from the address signal stored with different timing and transfers the signal to the input register 3a or 3b. The address register 5 receives the address signal from the program counter 4 to specify the address of the desired piece of data stored in the static memory 1. The lines from the output of the program counter 4 to the input of the input registers 3a 3b are rendered transmittable by tristate buffer registers 6a, 6b for the transfer of the information from the program counter 4. The buffer registers maintain a high-impedance state except when they function in response to a timing signal given by the control unit 11. The pattern selecting unit 7 comprises a pattern selecting button unit 8 for the operator to select the desired pattern formation, bight and feed address memories 9a, 9b for storing the head address of the information of each stitch pattern, and tristate input buffer registers 10a, 10b for rendering the lines from the memories 9a, 9b to the input registers 3a, 3b transmittable for the transfer of the address signal from the address memories 9a, 9b to the input registers 3a, 3b.

Table 8 shows the address data stored in the bight and feed address memories 9a, 9b for specifying the head data to be retrieved from the static memory 1.

Table 8

| Stitch pattern | Address specifying signal | Bight address signal | Feed address signal |
|---|---|---|---|
| 1. Straight | 0000 | 0000000 | 1011000 |
| 2. Zigzag | 0001 | 0000010 | 1011000 |
| 3. Mending | 0010 | 0000110 | 1011010 |
| 4. Blind | 0011 | 0001010 | 1011100 |
| 5. Buttonhole No. 1 | 0100 | 0001111 | 1011110 |
| 6. Buttonhole No. 2 | 0101 | 0010110 | 1100001 = |
| 7. Stretch | 0110 | 0000000 | 1100100 |
| 8. Feather | 0111 | 0000110 | 1100100 |

Table 8-continued

| Stitch pattern | Address specifying signal | Bight address signal | Feed address signal |
|---|---|---|---|
| 9. Smocking | 1000 | 0000110 | 1100101 |
| 10. Hem | 1001 | 0011101 | 1100100 |
| 11. Shell | 1010 | 0100011 | 1101000 |
| 12. Satin | 1011 | 0110101 | 1101000 |
| 13. Tulip | 1100 | 1000111 | 1101011 |

The 4-bit data on the left column represents the address specifying signals for retrieving the data stored in the address memories 9a, 9b. These signals are emitted from the control circuit 12 of the control unit 11 responsive to the pattern instructing signal given by the pattern selecting button unit 8. For example, when the pattern selecting button unit 8 specifies the mending stitch, the control circuit 12 produces an address specifying signal (0010) shown in Table 8. The signal is fed to the bight address memory 9a which emits an address signal (0000110) and to the feed address memory 9b which emits an address signal (1011010). The control unit 11 comprises the above-mentioned control circuit 12, an adder 13, a decoder 14 and two kinds of status counters 15a, 15b for the bight and feed. As described above, the control circuit 12 is responsive to the pattern specifying signal from the pattern selecting button unit 8 to feed an address specifying signal to the address memories 9a, 9b and also gives a timing signal to the input buffer registers 10a, 10b, input registers 3a, 3b, buffer registers 6a, 6b, program counter 4, address register 5, the output registers 35a, 35b to be described later, and the jump register 16 and status counters 15a, 15b included in the control unit 11. The address signal temporarily stored in the address register 5 for specifying the address of the data stored in the static memory 1 is fed to an input terminal A of the adder 13, and the 5-bit signal in the lower position of the data of the static memory 1 emitted therefrom in response to the address signal is fed to an input terminal B of the adder 13. These signals are added by the adder 13. The instruction word for extracting the next data represented by the 3-bit signal in the higher position of the output signal from the static memory 1 is decoded by the decoder 14, which in turn emits a signal to the control circuit 12 from its output terminal corresponding to the particular instruction word. The status counters 15a, 15b comprise a down counter. In response to the output signal from the decoder 14 which receives a specified piece of instruction data (110) among the order instructions, the control circuit 12 gives a timing signal to the status counters 15a, 15b, which in turn fetch and store the lower 5-bit data of the output signal from the static memory 1 the higher 3-bit data of which signal has been received by the decoder 14. The status counters 15a, 15b subtract 1 from the stored data until the stored data reduces to zero, every time the control circuit 12 gives a timing signal in response to the output signal from the decoder 14 which receives a specified piece of instruction data (101) among the order instructions. At the B input of the adder 13, the data line for the fifth bit is connected to the terminals of the adder 13 for the sixth and seventh bits, such that if the fifth bit of the input data is (1), the input is fed thereto as converted to 7-bit data including higher three bits of (111), and if it is (0), the higher three bits of the input are (000).

Indicated at 30 is a reference signal generator for producing the clock pulses to be given by the control circuit 12 to the respective components to change each component from one operation state to another state. The generator 30 comprises an oscillator 31 covering a frequency range of from several hundreds of KHz to several MHz, a counter 32 responsive to the output signal from the oscillator 31 and a decoder 39 for producing timing signals of $T_1$ to $T_7$ in accordance with the output code of the counter.

A timing pulse generator 33 feeds bight timing signals B and feed timing signals F to the control circuit 12 alternately in timed relation to the rotation of the machine main shaft, the signals B being generated when the needle slips off the fabric, the signals F being produced with timing that is convenient to alter the feed, namely when the feed dog lowers from the needle plate.

The data in the lower 5-bit position of the information from the static memory 1 is stored in a temporary memory 34 in response to the timing signals $S_{18}$ and $S_{19}$ from the control circuit 12. The memory 34 comprises two output registers 35a, 35b for the bight data and feed data. On receipt of output signals from the output registers 35a, 35b, a position control unit 36 controls the feed dog and bight.

Figure 8:
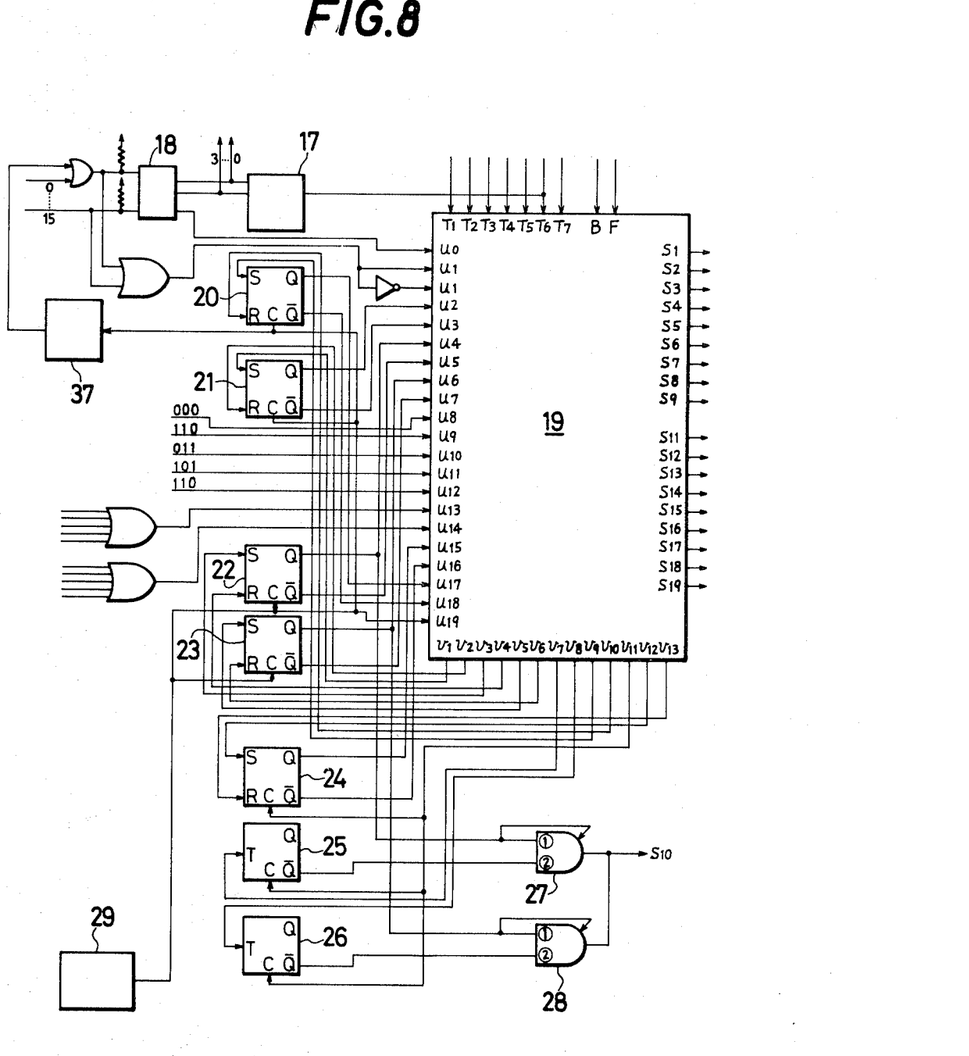
FIG. 8 is a diagram showing the control circuit of FIG. 7 in detail.

FIG. 8 shows in detail the construction of the control circuit 12 included in the control unit 11. The circuit comprises a counter 17, a multiplexer 18 and a logical portion 19. Every time the counter 17 receives a timing signal $T_6$, it cumulatively counts up the binary output signals for specifying the address of the head data of the stitch pattern stored in the address memories 9a, 9b. The multiplexer 18 gives an output signal notifying that the output signal from the counter 17 has become a signal specifying the address of the head data of the pattern specified by the pattern selecting button unit 8. The logical portion 19 receives output signals from the multiplexer 18, pattern instruction confirming signals from the pattern selecting button unit 8, timing signals from the reference signal generator 30, bight timing signals and feed timing signals from the timing pulse generator 33 and order instructing signals from the decoder 14 for giving operation timing signals $S_1, S_2, \ldots, S_{19}$ to these components. Flip-flops 20, 21, 22, 23, 24, 25, 26 which, together with the logical portion 19, constitute a logical circuit for giving timing signals $S_1, S_2, \ldots, S_{19}$ on receipt of the above-mentioned input signals. The flip-flop 21 is a key flip-flop. When the multiplexer 18 gives off a signal confirming that the counter 17 has emitted a binary output corresponding to one selecting button on the pattern selecting unit 8, and provided that the selecting flip-flop 20 to be described later has been reset, the key flip-flop 21 is set with timing $T_7$. After the selecting flip-flop 20 has been set with the timing $T_2$ of the next cycle and the address data from the address memories 9a, 9b has been fed to the input registers 3a, 3b with timing $T_3$, the key flip-flop 21 is reset with timing $T_5$. When the flip-flop 21 has been set with timing $T_7$, the flip-flop 20 will not be reset unless it is set with the timing $T_2$ of the next cycle and the pattern selecting button is released, the selecting flip-flop 20 thus preventing the key flip-flop 21 from repeating the foregoing operation even when the pattern selecting button is kept depressed. The flip-flop 22 is a bight flip-flop. Provided that the address of the head data of the specified stitch pattern has been registered in the input registers 3a, 3b and that the key flip-flop 21 has been reset, the bight flip-flop 22 is set with timing $T_1$ when a bight timing signal B is emitted on the initiation of operation of the machine. The flip-flop 22 is reset when the data stored in the bight output register 35a is fed to the pattern control unit 36. Indicated at 23 is a feed flip-flop which is set with timing T₁ provided that the address of the head data of the specified stitch pattern has been registered in the input registers 3a, 3b and that the key flip-flop 21 has been reset and which is reset when the data stored in the feed output register 35b is applied to the pattern control unit 36. Indicated at 24 is a control flip-flop for controlling the components so that the instruction on the pattern selection is invariably followed by the operation initiated by the bight timing signal B. The flip-flop 24 further ensures that the setting and resetting of the bight flip-flop 22 and the feed flip-flop 23 will take place alternately. Indicated at 25 is an up-down instructing flip-flop for the bight which, on receipt of a signal from the decoder 14 giving instruction to reverse the up-down function of the program counter 4, transfers an output signal to the program counter 4 by way of a subsequent AND gate 27. Similarly, an up-down instructing flip-flop 26 for the feed gives an output signal to the program counter 4 via a subsequent AND gate 28 in response to a signal from the decoder 14 instructing the flip-flop 26 to reverse the up-down function of the program counter 4. An initial resetting circuit 29 functions to reset the flip-flops 20 to 26 upon application of power supply voltage to the system.

Figure 9:
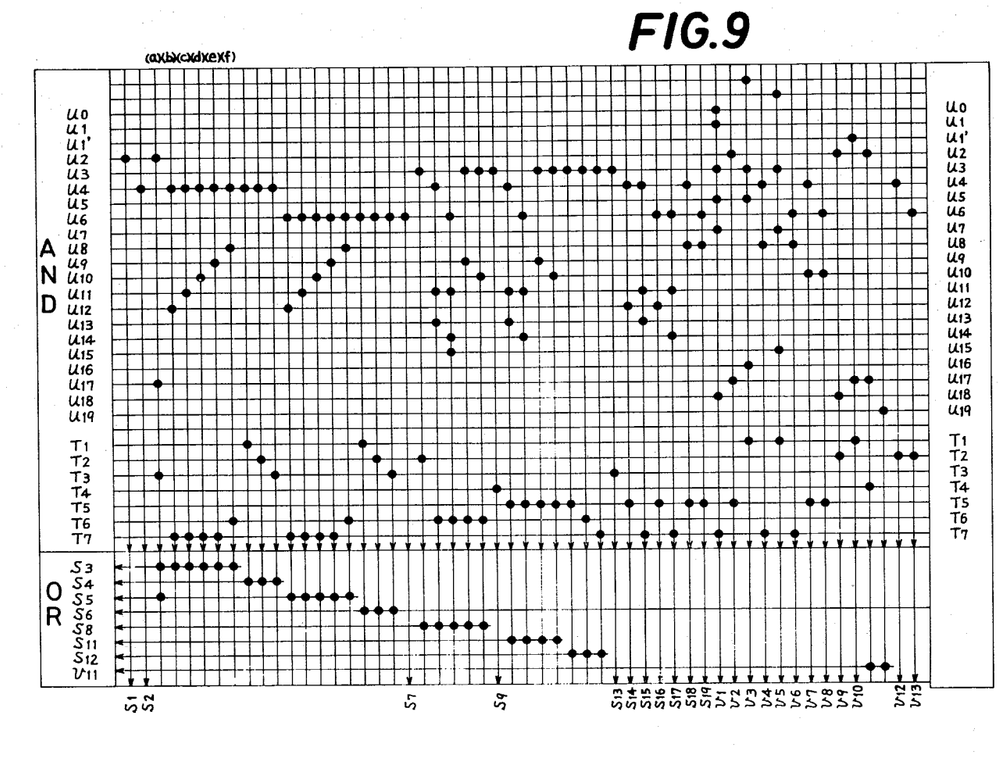
FIG. 9 is a matrix diagram showing the circuit structure of the logical portion of FIG. 8.

FIG. 9 is a matrix diagram illustrating the construction of the logical circuit of the logical portion 19 shown in FIG. 8 and involving a group of input terminals and a group of output terminals. The matrix diagram includes a logical product portion and a logical sum portion. The reference characters for input signals are indicated at the abscissa line ends of the logical product portion, while reference characters for output signals are indicated at the ordinate line ends and abscissa line ends of the logical sum portion. Output signals at the abscissa line ends of the ligical sum portion will be described, for example, with reference to signal S₃. The dots on the abscissa line S₃ are on ordinate lines (a), (b), (c), (d), (e), (f), on each of which dots are positioned for input signals which give a logical product. S₃ is defined by the logical sum of the corresponding logical products of input signals on the ordinate lines. Thus, $$S_3 = (U_2) \cdot (U_{17}) \cdot (T_3)$$
$$+ (U_4) \cdot (U_{12}) \cdot (T_7)$$
$$+ (U_4) \cdot (U_{11}) \cdot (T_7)$$
$$+ (U_4) \cdot (U_{10}) \cdot (T_7)$$
$$+ (U_4) \cdot (U_9) \cdot (T_7)$$
$$+ (U_4) \cdot (U_8) \cdot (T_7)$$

To describe the output signals at the ordinate line ends of the logical sum portion, S₁₇ for example, is defined by the logical product of the input signals corresponding to the dots on the ordinate line S₁₇. Therefore, $$S_{17} = (U_6) \cdot (U_{11}) \cdot (U_{14}) \cdot (T_7)$$

An example of the data stored in the static memory 1 according to this invention is already shown in Table 7. The instruction represented by the three bits in the higher position of the data will be described below.

(1) (000DDDDD)

(DDDDD) is sent to the output register 35a or 35b to reset the bight flip-flop 22 or feed flip-flop 23.

(2) a. (0100AAAA)

If the uppermost of the 5 bits in the lower position is 0, a jump takes place to an address greater than the present address, namely the present address+(0-00AAAA) address.

b. (0101A′A′A′A′)

If the uppermost of the 5 bits in the lower position is 1, the data jumps to the present address+(1-11A′A′A′A′) address wherein A′A′A′A′ indicates a complement for the numerical value to be subtracted from the address of the data (0101A′A′A′A′) concerned. With the adder 13 already described, the lower 5-bit data (1A′A′A′A′) of the data (0101A′A′A′A′) received on the input terminal B is converted to a 7-bit signal (111A′A′A′A′), which is added to the address signal received at the input terminal A of the data concerned, hence a jump to a smaller address than the present address.

(3) a. (0110AAAA)

If the uppermost of the 5-bits in the lower position is 0, the up-down function of the program counter 4 is reversed for a jump to the present address+(0-00AAAA) address.

b. (0111A′A′A′A′)

If the uppermost of the 5-bits in the lower position is 0, the up-down function of the program counter 4 is similarly reversed for a jump to the present address+(1-11A′A′A′A′) address. A′A′A′A′ is an indication of complement as in the case of (2) b.

(4) a. (1010AAAA)

When the count on the status counters 15a, 15b is 0, a jump takes place to the present address+1 address.

If the count on the status counters 15a, 15b is not 0, the data jumps to the present address+(AAAA) address, reducing the count by 1.

b. (1011A′A′A′A′)

When the count on the status counters 15a, 15b is 0, a jump takes place to the present address+1 address.

If the count is not 0, the data jumps to the present address+(111A′A′A′A′), reducing the count by 1.

(5) (110BBBBB)

The value (BBBBB) is set on the status counter 15a, 15b.

The foregoing data (1) to (5) can of course be modified as follows:

| (1) | (000DDDDD) | to | (0DDDDDDD) |
|---|---|---|---|
| (2)-a. | (0100AAAA | to | (1000AAAA) |
| (2)-b. | (0101A′A′A′A′) | to | (1001A′A′A′A′) |
| (3)-a. | (0110AAAA) | to | (1010AAAA) |
| (3)-b. | (0111A′A′A40 A′) | to | (1011A′A′A′A′) |
| (4)-a. | (1010AAAA | to | (1100AAAA) |
| (4)-b. | (1011A′A′A′A′) | to | (1101A′A′A′A′) |
| (5) | (110BBBBB) | to | (111BBBBB) |

Figure 10:
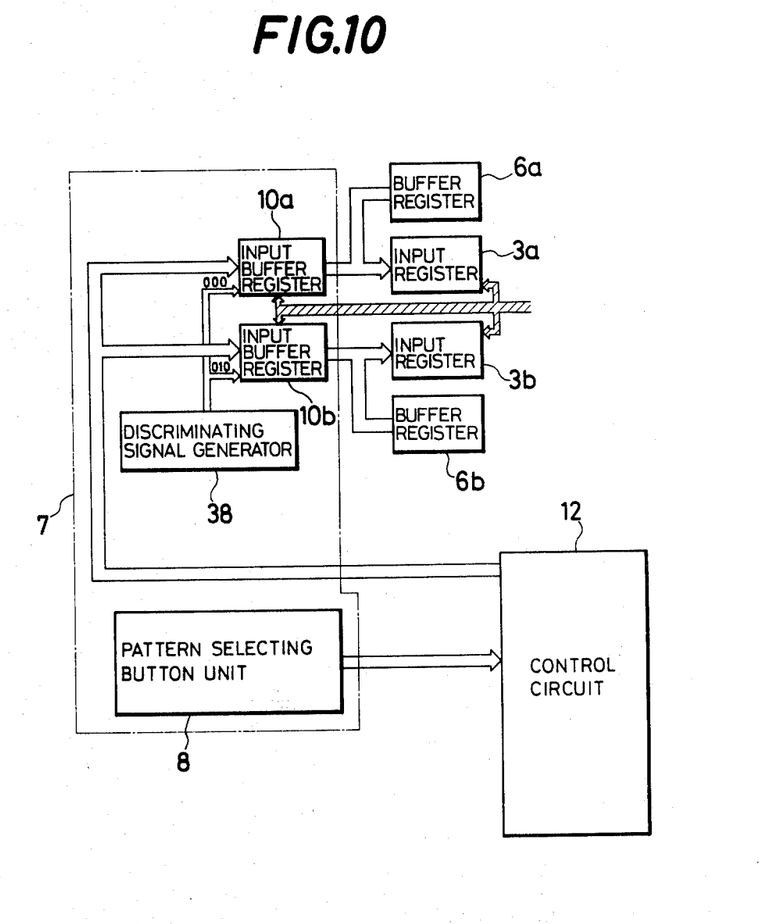
FIG. 10 is a block diagram showing part of another embodiment of this invention.

For use with the modified information, registers capable of storing 7-bit data are used as the output registers 35a, 35b. In this case, a particular piece of data is distinguishable as to whether it is output data or order instructing data, depending on whether the highest bit of that data is 0 or 1. The 7-bit data in the lower position of the output data is then usable as data relating to the displacement of the needle or to the feed of the feed dog. This provides an increased variety of output data. Further although the embodiment described includes the address memories 9a, 9b for storing the addresses of head data for stitch patterns stored in the static memory 1, such that the address in the memories 9a, 9b which is specified in response to the pattern selecting instruction from the pattern selecting unit 8 is fed as an address signal to the static memory 1, which in turn, produces the pattern head information of the specified address, this invention is not limited to such a construction but the address memories 9a, 9b can be eliminated, if desired. For example, the address memories 9a, 9b may be replaced by a discriminating signal generator 38 shown in FIG. 10 by which the 4-bit output signal to be emitted from the counter 17 of the control circuit 12 to the bight input buffer register 10a is converted to a 7-bit signal (AAAA000) by adding lower three bits of (000) to the output signal, and further by which the 4-bit output signal to be applied from the counter 17 to the feed buffer register 10b is converted to a 7-bit signal (AAAA010) by adding lower three bits of (010) to the output signal. Thus, the data stored in the static memory 1 may be so ordered that the 7-bit signals thus produced will correspond to the bight and feed start points for the pattern stitches. Table 9 below shows the program to be stored in the static memory 1 in the case where the data therein is addressed with such augmented code signals.

Table 9

| No. | Address data | Stored data | Stitch pattern |
|---|---|---|---|
| 1 | 0000000 | 00000000 | Start for straight stitch (bight) |
| 2 | 0000001 | 01011111 | |
| 3 | 0000010 | 00011001 | Start for straight stitch (feed) |
| 4 | 0000011 | 01011111 | |
| 5 | 0000100 | 00001111 | |
| 6 | 0000101 | 11000111 | |
| 7 | 0000110 | 00011111 | |
| 8 | 0000111 | 10111111 | |
| 9 | 0001000 | 01011100 | Start for blind stitch (bight) |
| 10 | 0001001 | 00010010 | |
| 11 | 0001010 | 01011111 | Start for blind stitch (feed) |
| 12 | 0001011 | 11000011 | |
| 13 | 0001100 | 00001100 | |
| 14 | 0001101 | 00011100 | |
| 15 | 0001110 | 10111110 | |
| 16 | 0001111 | 01000101 | To 21 |
| 17 | 0010000 | 01011011 | Start for buttonhole stitch No. 1 (bight) |
| 18 | 0010001 | 00010001 | |
| 19 | 0010010 | 00000000 | Start for buttonhole stitch No. 1 (feed) |
| 20 | 0010011 | 01011110 | |
| 21 | 0010100 | 00001100 | From 16 |
| 22 | 0010101 | 00000010 | |
| 23 | 0010110 | 01011110 | |
| 24 | 0010111 | 01100010 | |
| 25 | 0011000 | 00001111 | Start for shell pattern (bight) |
| 26 | 0011001 | 01000100 | |
| 27 | 0011010 | 00010001 | Start for shell pattern (feed) |
| 28 | 0011011 | 01011101 | |
| 29 | 0011100 | 01011100 | |
| 30 | 0011101 | 00000101 | |
| 31 | 0011110 | 00001011 | |
| 32 | 0011111 | 00010100 | |
| 33 | 0100000 | 00000111 | |
| 34 | 0100001 | 00011000 | |
| 35 | 0100010 | 00000100 | |
| 36 | 0100011 | 00011011 | |
| 37 | 0100100 | 00000010 | |
| 38 | 0100101 | 00011101 | |
| 39 | 0100110 | 0000000 | |
| 40 | 0100111 | 00011110 | |
| 41 | 0101000 | 00010001 | |
| 42 | 0101001 | 00011111 | |
| 43 | 0101010 | 00010001 | |
| 44 | 0101011 | 00011111 | |
| 45 | 0101100 | 01111110 | |
| 46 | 0101101 | ******** | |
| 47 | 0101110 | 00001111 | |
| 48 | 0101111 | 00011111 | |
| 49 | 0110000 | 01011110 | Start for zigzag (bight) |
| 50 | 0110001 | 00011001 | |
| 51 | 0110010 | 01011111 | Start for zigzag stich (feed) |
| 52 | 0110011 | 11000011 | |
| 53 | 0110100 | 00011100 | |
| 54 | 0110101 | 00001100 | |
| 55 | 0110110 | 10111110 | |
| 56 | 0110111 | 01000101 | |
| 57 | 0111000 | 01011011 | Start for buttonhole stitch No. 2 (bight) |
| 58 | 0111001 | 00000001 | |
| 59 | 0111010 | 00000000 | Start for buttonhole stitch No. 2 (feed) |
| 60 | 0111011 | 01011110 | |
| 61 | 0111100 | 00011100 | |
| 62 | 0111101 | 00010010 | |
| 63 | 0111110 | 01011110 | |
| 64 | 0111111 | 00000000 | |
| 65 | 0000001 | 01011111 | Start for stretch stitch (bight) |
| 66 | 1000001 | 00001010 | |
| 67 | 1000010 | 00011010 | Start for stretch stitch (feed) |
| 68 | 1000011 | 00011010 | |
| 69 | 1000100 | 01011101 | |
| 70 | 1000101 | 01100010 | |
| 71 | 1000110 | 00001111 | |
| 72 | 1000111 | 00000101 | |
| 73 | 1001000 | 00010101 | Start for smocking stitch (bight) |
| 74 | 1001001 | 01000010 | |
| 75 | 1001010 | 01011000 | Start for smocking stitch (feed) |
| 76 | 1001011 | 00011111 | |
| 77 | 1001100 | 01111100 | |
| 78 | 1001101 | 11000101 | |
| 79 | 1001110 | 00001111 | |
| 80 | 1001111 | 1011111 | |
| 81 | 1010000 | 00011111 | Start for hemstitch (bight) |
| 82 | 1010001 | 01011100 | |
| 83 | 1010010 | 01011000 | Start for hemstitch (feed) |
| 84 | 1010011 | 01100010 | |
| 85 | 1010100 | 00010110 | |
| 86 | 1010101 | 00010011 | |
| 87 | 1010110 | 00010011 | |
| 88 | 1010111 | 01000101 | |
| 89 | 1011000 | 01010011 | Start for mending stitch (bight) |
| 90 | 1011001 | 00010010 | |
| 91 | 1011010 | 01011111 | Start for mending stitch (feed) |
| 92 | 1011011 | 01011101 | |
| 93 | 1011100 | 00000010 | |
| 94 | 1011101 | 00000011 | |
| 95 | 1011110 | 00000101 | |
| 96 | 1011111 | 00000000 | |
| 97 | 1100000 | 00011010 | |
| 98 | 1100001 | 00011000 | |
| 99 | 1100010 | 00000011 | |
| 100 | 1100011 | 00000110 | |
| 101 | 1100100 | 00001000 | |
| 102 | 1100101 | 00011100 | |
| 103 | 1100110 | 00011100 | |
| 104 | 1100111 | 01111111 | |
| 105 | 1101000 | 01100010 | |
| 106 | 1101001 | 00001111 | |
| 107 | 1101010 | 00001111 | |
| 108 | 1101011 | 00001111 | |
| 109 | 1101100 | 00001011 | |
| 110 | 1101101 | 00000111 | |
| 111 | 1101110 | 00000011 | |
| 112 | 1101111 | 01000101 | |
| 113 | 1110000 | 01011001 | Start for tulip pattern (bight) |
| 114 | 1110001 | ******** | |
| 115 | 1110010 | 01111010 | Start for tulip pattern (feed) |
| 116 | 1110011 | 01011101 | |

Table 9-continued

| Address No. | data | Stored data | Stitch pattern |
|---|---|---|---|
| 117 | 1110100 | 00000111 | |
| 118 | 1110101 | 00001011 | |
| 119 | 1110110 | 00000011 | |
| 120 | 1110111 | 00000001 | |
| 121 | 1111000 | 00010011 | |
| 122 | 1111001 | 00011001 | |
| 123 | 1111010 | 00011111 | |
| 124 | 1111011 | 00011001 | |
| 125 | 1111100 | 00011111 | |
| 126 | 1111101 | 01111110 | |

The underlined pieces of address data given in Table 9 are the above-mentioned augmented code signals which are used in the order indicated by the arrows on the right side of the stored data.

The system of the foregoing construction will operate in the following manner for example when forming a blind stitch and tulip pattern.

BLIND STITCH

Table 10 shows the data given in Table 7 for the formation of blind stitch.

Table 1Q

| Bight | | Feed | |
|---|---|---|---|
| Address data | Stored data | Address data | Stored data |
| 0001010 | 00001111 | 1011100 | 00011000 |
| 0001011 | 11000111 | 1011101 | 01011111 |
| 0001100 | 00011111 | | |
| 0001101 | 10111111 | | |
| 0001110 | 01011100 | | |

When the specified selecting button on the pattern selecting button unit 8 for instructing the blind stitch is depressed, the 4-bit address specifying signal (0011) corresponding to the blind stitch is set on the multiplexer 18. The output of the counter 17 which has amounted to (0011) with timing $T_6$ in the course of $T_1$-$T_7$ cycles is fed to the multiplexer 18, whereupon the multiplexer 18 gives off an output signal $U_6$ confirming that the output signal (0011) from the counter 17 is in coincidence with the signal (0011) set on the multiplexer 18. While the selecting button is held depressed, a signal $U_1$ is fed to the logical portion 19. In the presence of the signal $U_6$ indicating that the output signal from the counter 17 is (0011) and of the signal $U_1$ indicating that the selecting button is on, and further provided that the key flip-flop 21, bight flip-flop 22, feed flip-flop 23 and selecting flip-flop 20 have been reset, the key flip-flop 21 is set with the next timing $T_7$. The selecting flip-flop 20 is set with the subsequent timing $T_2$. A conduction instructing control signal $S_1$ is given to the input buffer registers 10a, 10b so that the address data (0001010), (1011100) read out from the address memories in response to the address specifying signal (0011) from the counter 17 can be transferred to the input registers 3a, 3b. With the subsequent timing $T_3$, the input registers 3a, 3b receive the head addresses (0001010), (1011100) of the pattern data on recepit of control signals $S_3$, $S_5$ given by the logical portion 19. With the next timing $T_4$, the control flip-flop 24 is reset on receipt of a resetting signal $v_{11}$ from the logical portion 19, with the result that after the start of the operation of the machine, a bight timing signal B is invariably given to the control circuit 12 first. With the timing $T_4$, the flip-flops 25, 26 for giving an up-down instruction signal to the program counter 4 are also reset on receipt of the signal $v_{11}$. Thus a signal (1) is fed to the input terminals 2, 2 of the AND gates 27, 28. With the subsequent timing $T_5$, the key flip-flop 21 is reset, waiting for a bight timing signal. When the selecting button is released, the control flip-flop 20 is reset with a timing $T_1$ during a certain cycle, waiting for a pattern selecting signal until another pattern stitching instruction is given.

Bight operation (1)

When the machine starts to operate after the key flip-flop 21 and control flip-flop 24 have been reset through the foregoing sequential operation, the bight flip-flop 22 is set with the timing $T_1$ upon the emission of bight timing signal B. The bight input register 3a receives control signals $S_4$ given by the control circuit 12 with timings $T_1$, $T_2$, $T_3$ and becomes ready for the transfer of the data (0001010) stored therein. With the timing $T_2$, the control flip-flop 24 is set for the receipt of the next feed timing signal F. On the other hand, the program counter 4, on receipt of a control signal $S_8$ from the control circuit 12 with the timing $T_2$, receives the data (0001010), which is then transferred to the address register 5. The register 5 feeds the data (0001010) to the static memory 1 in response to a control signal $S_{13}$ given by the control circuit 12 with the subsequent timing $T_3$. The data specifies the data (00001111) included in the information stored in the static memory, with the result that (00001111) is read out on the output terminal of the memory 1. With the next timing $T_4$, the control circuit 12 gives a clock pulse $S_9$ to the program counter 4, adding 1 to the data (0001010) stored in the counter 4 to give (0001011). Since when the control flip-flop 24 is reset on receipt of the signal $v_{11}$, the flip-flops 25, 26 are also reset at the same time with a signal (1) applied to the input terminal 2 of the AND gate 27, a signal (1) is also applied to the input terminal 1 of the AND gate 27 while the bight flip-flop 22 is in its set position. Accordingly the AND gate 27 gives an "UP" instructing control signal $S_{10}$ to the program counter 4. The upper 3-bit data (000) of (00001111) read out on the output terminal of the static memory 1 with the timing $T_3$ is decoded by the decoder 14, which feeds to the logical portion 19 of the control circuit 12 a signal $U_8$ indicating that the data (00001111) is the data to be emitted from the temporary memory 34. In response to the signal $U_8$, the control circuit 12 gives a control signal $S_{18}$ to the bight output register 35a with the subsequent timing $T_5$. The lower 5-bit data (01111) of the output (00001111) from the static memory 1 is fed to the register 35a and given to the pattern control unit 36. By way of the bight buffer register 6a which is kept transmittable while the bight flip-flop 22 is in its set position, the data (0001011) stored in the program counter 4 and resulting from the addition of 1 is transferred to the bight input register 3a which receives a control signal $S_3$ from the control circuit 12 with the next timing $T_6$. With the subsequent timing $T_7$, the bight flip-flop 22 is reset.

Feed (1)

The feed flip-flop 23 is set with timing $T_1$ upon the emssion of feed timing signal F subsequent to the bight timing signal B. A sequential feed operation thereafter follows. The data (1011100) stored in the feed input register 3b is rendered transferrable with control signals $S_6$ given by the control circuit 12 to the register 3b with timings $T_1$, $T_2$, $T_3$. With the timing $T_2$, the control flip-flop 24 is set in preparation for the acceptance of the subsequent bight timing signal B. On the other hand, the program counter 4, on receipt of a control signal S₈ from the control circuit 12 with the timing T₂, receives the data (1011100), which is then transferred to the address register 5. The register 5 feeds the data (1011100) to the static memory 1 in response to control signal S₁₃ given by the control circuit 12 with the subsequent timing T₃. The data specifies the data (00011000) included in the information stored in the static memory, with the result that data (00011000) with the address (1011100) is read out on the output terminal of the memory 1. With the next timing T₄, the control circuit 12 gives a clock pulse S₉ to the program counter 4, adding 1 to the data (1011100) stored in the counter 4 to give (1011101). Approximately in the same manner as in the case of "Bight (1)" described above, since a signal (1) is applied to the input terminals 1, 2 of the AND gate 29 while the up-down instructing flip-flop 26 and flip-flop 23 for the feed are in set position, the AND gate 28 emits a control signal S₁₀ to give an "UP" instruction to the program counter 4 subsequent to the Bight (1) operation. The upper 3-bit portion (000) of the data (00011000) read out on the output terminal of the static memory 1 with the timing T₃ is decoded by the decoder 14, which feeds to the logical portion 19 of the control circuit 12 a signal U₈ indicating that the data (00011000) is the data to be emitted from the temporary memory 34. In response to the signal U₈, the control circuit 12 gives a control signal S₁₉ to the feed output register 35b with the subsequent timing T₅. The lower 5-bit data (11000) of the output (00011000) from the static memory 1 is fed to the register 35b and given to the pattern control unit 36. By way of the feed buffer register 6b which is kept transmittable while the feed flip-flop 23 is in its set position, the data (1011101) stored in the program counter 4 and resulting from the addition of 1 is transferred to the feed input register 3b which receives a control signal S₅ from the control circuit 12 with the next timing T₆. With the subsequent timing T₇, the feed flip-flop 23 is reset.

Bight (2)

When a bight timing signal B is produced, exactly the same operation as described above is performed with timings T₁ through T₄. Based on the address specifying signal (0001011) stored in the bight input register 3a, the data (11000111) stored in the static memory is read out. In the program counter 4, the data (0001011) stored therein becomes (0001100) with addition of 1. The upper 3-bit portion (110) of the data (11000111) read out on the output terminal of the static memory 1 with the timing T₃ is decoded by the decoder 14, which gives the control circuit 12 an instruction signal U₁₂ to set the lower 5-bit data (00111) of the data (11000111) on the status counter 15a. Accordingly the lower 5-bit portion (00111) of the data (11000111) read out on the output terminal of the static memory 1 is fed to the bight status counter 15a which has received a control signal S₁₄ with timing T₅. The data (0001100) resulting from the addition of 1 and stored in the program counter 4 is fed by way of the bight buffer register 6a to the bight input register 3a receiving a control signal S₃ from the control circuit 12 with the next timing T₇. Even when the operation with the timing T₇ has been completed, the bight flip-flop 22 will not be reset unless it receives from the decoder 14 a signal U₈ notifying that the data read out from the static memory 1 is output data with an upper 3-bit code of (000). Thus the flip-flop 22 still remains in its set state. Accordingly without waiting for the next feed timing signal F, the sequential operation involving an address (0001100) is performed during the subsequent cycle of T₁–T₇ in the same manner as the "Bight (1)" operation described above. Based on the data (0001100) stored in the bight input register 3a, the data (00011111) stored in the static register 1 is read out, and the lower 5-bit data (11111) of that data is emitted from the bight input register 35a. The data (0001100) stored in the program counter 4 turns, with addition of 1, to (0001101), which is fed to the bight input register 3a by way of the bight buffer register 6a. The bight flipf-flop 22 is reset with timing T₇.

Feed (2)

With application of a feed timing signal F, the feed flip-flop 23 is set with timing T₁, followed by a sequential feeding operation. The data (1011101) previously stored in the feed input register 3b is rendered transferable with control signals S₆ given with timings T₁, T₂, T₃. With the timing T₂, the control flip-flop 24 is set for the acceptance of the next bight timing signal B. The data (1011101) from the feed input register 3b is fed to the program counter 4 in response to a control signal S₈ given with the same timing T₂ and is transferred to the next address register 5. The data (1011101) stored in the address register 5 is transferred to the static memory 1 in response to a control signal S₁₃ given with the next timing T₃. This addresses the data (01011111) stored in the static memory 1. Thus the data (01011111) with the address of (1011101) is read out on the output terminal of the static memory 1. With the next timing T₄, a clock pulse S₉ adds 1 to the data (1011101) stored in the program counter 4, giving (1011110). The sequential operation so far performed with timings T₁ to T₄ is the same as the bight or feed operation described before. However, since the upper 3-bit portion of the data (01011111) read out from the static memory 1 is (010), the decoder 14 gives the control circuit 12 an instruction signal U₉ corresponding to (010). On the other hand, the addressing signal (1011101) read out from the address register 5 is fed to the input terminal A of the adder 13, while the 7-bit signal (1111111) converted from the lower 5-bit portion (11111) of the data read out from the static memory 1 is applied to the input terminal B of the adder, and the following addition is performed.

```
 1011101
+1111111
1 1011100
```

The lower 7-bit code (1011100) of the sum is produced as an output. In response to the instruction signal U₉ from the decoder 14, the control circuit 12 gives a control signal S₁₁ to the jump register 16 with timing T₅. The output signal (1011100) from the adder 13 is fed to the jump register 16. A control signal S₁₂ is given to the jump register 16 with timings T₅, T₆, T₇, rendering the data (1011100) therin stored transferable. With the timing T₆, a control signal S₈ is given to the program counter 4, which receives an output signal (1011100) from the jump register 16, with the result that the data (1011110) in the counter is modified to (1011100). With the next timing T₇ with response to a control signal S₅, the data (1011100) stored in the program counter 4 is stored in the feed input register 3b. As is the case with the "Bight (2)" operation, the feed flip-flop 23 still remains in its set state since the data read out from the static memory 1 is not output data. Thus without waiting for the next bight timing signal, a sequential operation involving the address (1011100) is subsequently performed during the next cycle of $T_1$ to $T_7$. Stated more specifically, data (1011100) is fed to the program counter 4 on receipt of a control signal $S_8$ with the timing $T_2$ of the next cycle and, with the following timing $T_3$, the address register 5 receives the data (1011100) on receipt of a control signal $S_{13}$. At the same time, the data (00011000) with the address (1011100) stored in the static memory 1 is read out. With the following timing $T_4$, the program counter 4 receives a clock pulse $S_9$, which turns the data (1011100) stored therein to (1011101) with addition of 1. The same operation as in the performance of "Feed (1)" is thereafter conducted; on receipt of a control signal $S_{19}$, the output register 35b emits the lower 5-bit portion (11000) of the data (00011000). The data (1011101) in the program counter 4 is fed to the feed input register 3b in response to a control signal $S_5$ with timing $T_6$. The feed flip-flop 23 is reset with timing $T_7$. The feed buffer register 6b is brought into a high-impedance state, holding the signal transfer line blocked.

Bight (3)

When a bight timing signal B is subsequently produced, exactly the same operation as already described is conducted with timings $T_1$ through $T_4$. In accordance with the data (0001101) stored in the bight input register 3a, the data (10111111) stored in the static memory 1 is read out. The data (0001101) in the program counter 4 becomes (0001110) with addition of 1. With timing $T_3$, the upper 3-bit code (101) of the data (10111111) read out from the static memory 1 is decoded by the decoder 14, which in turn gives the control circuit 12 an instruction signal $U_{11}$ corresponding to the code (101). On the other hand, the data (0001101) read out from the address register 5 is fed to the input terminal A of the adder 13, while the 7-bit data (1111111) converted from the lower 5-bit code of the data (10111111) read out from the static memory 1 is fed to the input terminal B of the adder. The adder performs the following addition.

```
 :0001101
+:1111111
1:0001100
```

The lower 7-bit code (0001100) of the sum is produced as an output. The control circuit 12 which has received the instruction signal $U_{11}$ corresponding to (101) and emitted from the decoder 14 confirms the data stored in the bight status counter 15a which has the data (00111) stored therein by the previous operation. Unless this data is 0, the jump register 16 receives the output signal (0001100) from the adder 13 in response to a control signal $S_{11}$ with the next timing $T_5$. With control signals $S_{12}$ given to the jump register 16 with timings $T_5$, $T_6$, $T_7$, the data stored in the register 16 becomes emittable. With the output data (0001100) from the jump register 16 fed to the program counter 4 in response to a control signal $S_8$ with timing $T_6$, the data (0001110) previously stored therein is modified to (0001100). A clock pulse $S_{15}$ applied to the bight status counter 15a with the next timing $T_7$ subtracts 1 from the data (00111) stored in the counter 15a, giving (00110). On receipt of a control signal $S_3$ with the same timing $T_7$, the bight input register 3a receives the data (0001100) from the program counter 4. The data read out from the static memory 1 is not output data including the upper 3-bit code of (000), so that the bight flip-flop 22 still remains in its set state. Thus a sequential bight operation is performed also with the following timings $T_1$ through $T_7$. In this cycle, the lower 5-bit data (11111) of (00011111) with the address (0001100) is emitted from the bight output register 35b. With 1 added to the data (0001100) in the program counter 4, the data (0001101) is fed to the bight input register 3a, and the bight flip-flop 22 is reset.

Every time the bight flip-flop 22 is reset, the operation of "Feed (2)" described is thereafter repeated with the emission of the following feed timing signal F. On the other hand, every time the bight flip-flop 22 is reset, the foregoing operation of "Bight (3)" is repeated with the emission of the following bight timing signal B. After the "Bight (3)" operation has been performed, the "Feed (2)" operation and "Bight (3)" operation are alternately conducted to complete "Bight (9)" operation and "Feed (9)" operation.

Bight (10)

With the emission of a bight timing signal B, operation starts with the address (0001101) stored in the bight input register 3a by the immediately preceding "Bight (9)" operation. Since 1 is substracted from the data in the bight status counter 15a every time the bight operation is performed, the data is 0 when the "Bight (9)" operation has been conducted, so that nothing is performed with timings $T_5$, $T_6$ during "Bight (10)" operation. The data (0001110) stored in the program counter 4 and resulting from addition of 1 is transferred to the bight input register 3a in response to a control signal $S_3$ given with timing $T_7$. With the bight flip-flop 22 still in its set state at this time, operation involving the address (0001110) is performed with the following timings $T_1$ to $T_7$. Since the data (01011100) with the address (0001110) includes an upper 3-bit code of (010), the adder 13 adds the output data (0001110) from the address register 5 to the data (1111100) obtained by converting the lower 5-bit code (11100) of the output data (01011100) from the static memory 1, as in the previous "Feed (2)" operation. Thus,

```
 :0001110
+:1111100
1:0001010
```

The output signal (0001010) from the adder 13 is fed to the bight input register 3a from the jump register 16 via the program counter 4. Operation with the address (0001010) is conducted during the next cycle $T_1$–$T_7$. The data with the address (0001010) is (00001111) as in the "Bight (1)" operation. The bight output register 35a therefore produces an output of (01111). Data (0001011) is transferred to the bight input register 3a, and the bight flip-flop 22 is reset.

Table 11 shows the operations described above.

Table 11

| Bight timing signal | Address data to be accessed | Feed timing signal | Address data to be accessed |
|---|---|---|---|
| $t_1$ | 0001010 | $t_1'$ | 1011100 |
| $t_2$ | 0001011 | $t_2'$ | 1011101 |
|  | 0001100 |  | 1011100 |
| $t_3$ | 0001101 | $t_3'$ | 1011101 |
|  | 0001100 |  | 1011100 |
| $t_4$ | 0001101 | $t_4'$ | 1011101 |
|  | 0001100 |  | 1011100 |
| $t_5$ | 0001101 | $t_5'$ | 1011101 |

Table 11-continued

| Bight timing signal | Address data to be accessed | Feed timing signal | Address data to be accessed |
|---|---|---|---|
|  | 0001100 |  | 1011100 |
| $t_6$ | 0001101 | $t_6'$ | 1011101 |
|  | 0001100 |  | 1011100 |
| $t_7$ | 0001101 | $t_7'$ | 1011101 |
|  | 0001100 |  | 1011100 |
| $t_8$ | 0001101 | $t_8'$ | 1011101 |
|  | 0001100 |  | 1011100 |
| $t_9$ | 0001101 | $t_9'$ | 1011101 |
|  | 0001100 |  | 1011100 |
| $t_{10}$ | 0001101 | $t_{10}'$ | 1011101 |
|  | 0001110 |  | 1011100 (same as $t_1'$) |
|  | 0001010 (same as $t_1$) |  |  |
|  | Followed by repetition of $t_2$ et seq. |  |  |

TULIP PATTERN

Table 12 shows the data given in Table 7 for the formation of tulip pattern.

Table 12

| Bight | | Feed | |
|---|---|---|---|
| Address data | Stored data | Address data | Stored data |
| 1000110 | 01100010 | 1101010 | 01100001 |
| 1000111 | 00001111 | 1101011 | 00011000 |
| 1001000 | 00001111 | 1101100 | 00011000 |
| 1001001 | 00001111 | 1101101 | 00011000 |
| 1001010 | 00001111 | 1101110 | 00001000 |
| 1001011 | 00001011 | 1101111 | 00000110 |
| 1001100 | 00000111 | 1110000 | 00000011 |
| 1001101 | 00000111 | 1110001 | 00011000 |
| 1001110 | 00000111 | 1110010 | 00011010 |
| 1001111 | 00001011 | 1110011 | 00000000 |
| 1010000 | 00000011 | 1110100 | 00000101 |
| 1010001 | 00000001 | 1110101 | 00000011 |
| 1010010 | 00010011 | 1110110 | 00000010 |
| 1010011 | 00011001 | 1110111 | 00010011 |
| 1010100 | 00011111 | 1111000 | 00010011 |
| 1010101 | 00011001 | 1111001 | 00010110 |
| 1010110 | 00011111 | 1111010 | 01111111 |
| 1010111 | 01111101 |  |  |

When the selecting button for the formation of tulip pattern is depressed, the counter 17 emits an output signal (1100), in response to which (1000111) and (1101011) are read out from the address memories 9a, 9b and fed to the bight input register 3a and the feed input register 3b respectively. The system is made ready for the initiation of operation exactly in the same manner as in the formation of blind stitch described above.

Bight (1)

When the first bight timing signal B is emitted with the start of machine operation, the bight flip-flop 22 is set with timing $T_1$. Operation with the address (1000111) stored in the bight input register 3a thereafter follows in the same manner as in the formation of blind stitch described. Thus the lower 5-bit code (01111) of the data (00001111) with the address (1000111) is fed from the bight output register 35a to the pattern control unit 36 and the next address (1001000) is stored in the bight input register 3a, whereupon the bight flip-flop 22 is reset.

Feed (1)

When a feed timing signal F is emitted following the bight timing signal B, the feed flip-flop 23 is set with the timing $T_1$ as is the case with "Bight (1)". This is followed by a sequential operation relating to the address (1101011) stored in the feed input register 3b previously. Thus the lower 5-bit code (11000) of the data (00011000) specified by the address (1101011) is fed to the pattern control unit 36 from the feed output register 35b, while the next address (1101100) is stored in the feed input register 3b. The feed flip-flop 23 is reset. In response to bight timing signals B and feed timing signals F thereafter produced, similar procedures are repeated with the following addresses to complete the operation of "Bight (2)," "Feed (2)," ..., "Bight (16)."

Feed (16)

With the emission of a feed timing signal F, the same operation as already described is performed with timings $T_1$ to $T_4$. The address (1111010) stored in the feed input register 3b by the preceding "Feed (15)" operation is accessed to read out the data (01111111) from the static memory 1, while a clock pulse $S_9$ is applied to the program counter 4, adding 1 to the data therein to afford (1111011). Since the data (01111111) read out from the static memory 1 includes an upper 3-bit code of (011), the decoder 14 decoding the signal (011) feeds an instruction signal $U_{10}$ to the control circuit 12 in corresponding relation to the signal (011). On the other hand, the address signal (1111010) emitted from the address register 5 and the signal (1111111) obtained by converting the lower 5-bit code (11111) of the data (01111111) having the address are fed to the adder 13 in which the following operation is conducted.

$$\begin{array}{r}1111010\\+1111111\\\hline 1:1111001\end{array}$$

The lower 7-bit code (1111001) of the resulting value is sent out. In response to the instruction signal $U_{10}$ from the decoder 14 which has received the data (011), the control circuit 12 applies a control signal $S_{11}$ to the jump resistor 16 with timing $T_5$, whereupon the jump register 16 receives the output data (1111001) from the adder 13. Since the up-down instructing flip-flop 26 is set on receipt of a clock pulse $v_8$ with the same timing $T_5$, control signal $S_{10}$ will not be emitted from the AND gate 28. The program counter 4 is given a down instruction. The program counter 4 which receives a control signal $S_8$ with the subsequent timing $T_6$ stores the data (1111001) from the jump register 16 in place of the data (1111011) previously stored. Operation with the address (1111001) thereafter follows with the next timings $T_1$ to $T_7$. Since the upper 3-bit code of the data (00010110) specified by the address (1111001) is (000), the lower 5-bit signal (10110) thereof is sent to the pattern control unit 36 by way of the feed output register 35b. The program counter 4 which is a down counter at this time receives a clock pulse $S_9$ with timing $T_4$, whereupon 1 is subtracted from the data (1111001) stored therein to give data (1111000), which is transferred to the feed input register 3b which receives a control signal $S_5$ with timing $T_6$. Every time a feed timing signal F is emitted subsequently, a sequential feeding operation is performed with the address derived from the previous data by subtraction of 1. Thus the operation proceeds in the reverse order of "Feed (15)," "Feed (14)" ..., "Feed (1)."

Bight (17)

When a bight timing signal B is produced subsequent to the completion of "Feed (16)" operation, operation is performed with the address (1010111) stored in the bight input register 3a in "Bight (16)" operation. Since the data (01111110) specified by the address includes a higher 3-bit code of (011), the adder 13 performs the following operation as in the previous "Feed (15)" operation.

$$\begin{array}{r}1010111\\+1111110\\\hline 1:1010101\end{array}$$

The output signal (1010110) from the adder 13 is stored in the bight input register 3a via the jump register 16 and program counter 4. The program counter 4 is reversed from up counter to down counter. The following operation is performed with the address (1010110) with the next timing $T_1$ to $T_7$. The bight input register 3a stores the data (1010101) which is obtained by subtracting 1 from the present address (1010110), whereby the operation of Bight (17) is completed. Every time the control circuit 12 receives a bight timing signal B, a sequential bight operation is performed with the address which is smaller than the preceding one by 1. Thus the operation proceeds in the reverse order of "Bight (15)," "Bight (14)," ..., "Bight (1)." The "Bight (1)" operation is followed by operation with address (1000110). Since the data (01100010) specified by the address includes an upper 3-bit code of (011), the up-down function of the program counter 4 is reversed to render the counter serviceable as an up counter for the operation with the above address. Similarly the "Feed (1)" operation is followed by operation with an address (1101010) which specifies data (01100001) including an upper 3-bit code of (011), so that the program counter 4 is reversed to an up counter. If the machine continues to operate in this state, the symmetrical pattern will be formed repeatedly.

Table 13 shows the foregoing operations.

Table 13

| Bight timing signal | Address data to be accessed | Feed timing signal | Address data to be accessed |
|---|---|---|---|
| $t_1$ | 1000111 | $t_1'$ | 1101011 |
| $t_2$ | 1001000 | $t_2'$ | 1101100 |
| $t_3$ | 1001001 | $t_3'$ | 1101101 |
| $t_4$ | 1001010 | $t_4'$ | 1101110 |
| $t_5$ | 1001011 | $t_5'$ | 1101111 |
| $t_6$ | 1001100 | $t_6'$ | 1110000 |
| $t_7$ | 1001101 | $t_7'$ | 1110001 |
| $t_8$ | 1001110 | $t_8'$ | 1110010 |
| $t_9$ | 1001111 | $t_9'$ | 1110011 |
| $t_{10}$ | 1010000 | $t_{10}'$ | 1110100 |
| $t_{11}$ | 1010001 | $t_{11}'$ | 1110101 |
| $t_{12}$ | 1010010 | $t_{12}'$ | 1110110 |
| $t_{13}$ | 1010011 | $t_{13}'$ | 1110111 |
| $t_{14}$ | 1010100 | $t_{14}'$ | 1111000 |
| $t_{15}$ | 1010101 | $t_{15}'$ | 1111001 |
| $t_{16}$ | 1010110 | $t_{16}'$ | 1111010 |
|  |  |  | 1111001 (same as $t_{15}'$) |
| $t_{17}$ | 1010111 | $t_{17}'$ | 1111000 (same as $t_{14}'$ |
|  | 1010101 (same as $t_{15}$) |  |  |
| $t_{18}$ | 1010100 (same as $t_{14}$) | $t_{18}'$ | 1110111 (same as $t_{13}'$) |
| : | : | : | : |
| $t_{30}$ | 1001000 (same as $t_2$) | $t_{30}'$ | 1101011 (same as $t_1'$) |
| $t_{31}$ | 1000111 (same as $t_1$) | $t_{31}'$ | 1101010 |
|  |  |  | 1101011 (same as $t_1'$) |
| $t_{32}$ | 1000110 | $t_{32}'$ | 1101100 (same as $t_2'$) |
|  | 1001000 (same as $t_2$) |  |  |
| : |  | : |  |
| Repetition of $t_3$ et seq. |  |  |  |

The operation of the present system has been described above when forming a blind stitch and a tulip pattern. The basic functions of the system have been fully described with reference to these two examples, so that the operations for forming other patterns will not be stated.

While the foregoing description has been given in the case where the sewing machine is initiated into operation after a particular pattern selecting instruction has been given, the pattern in the course of forming will be changed over in the following manner.

On depression of a selecting button, the new pattern selecting instruction is confirmed with timing $T_7$, and the operation proceeds to the stage involving timing $T_5$. By the time the operation with timings $T_7$ to $T_5$ has been completed, the control circuit is ready for the acceptance of a bight timing signal B, so that the system can be changed over for the formation of another pattern. Thus even in the course of high-speed stitching operation, the stitch pattern is easily changeable by depression of a selecting button.

Further when the power supply switch is closed to energize the system, the initial resetting circuit 29 emits a signal $U_{19}$, which resets the selecting flip-flop 20, key flip-flop 21, bight flip-flop 22 and feed flip-flop 23. Further on receipt of the output signal $U_{19}$, the logical portion 19 produces an output signal $v_{11}$, which resets the control flip-flop 24 and the up-down instructing flip-flops 25, 26 for the bight and feed. The above-mentioned output signal $U_{19}$ is also delivered to the straight stitch operation selecting line of the multiplexer 18 via the off delay timer 37, so that an input equivalent to that resulting from depression of the straight stitch selecting button is given to the multiplexer 18. Thus the seven flip-flops included in the control circuit 12 are reset simultaneously with the energization of the system. In this way, the straight stitch forming operation is automatically selected. This serves to avoid an inadvertent error such as retrieval of an undesired stitch pattern even when the machine is initiated into operation before the desired selecting button is depressed. Since the system is automatically set, on closing the power supply switch, for the straight stitch which is most frequency used, the operator need not depress the selecting button therefor.

When forming a symmetrical pattern such as the tulip pattern shown in FIG. 1 according to this invention, the data used for forming one-half of the pattern on one side of the line of symmetry is read out in the reverse order for the other half of the pattern, so that the memory requires approximately one-half the capacity conventionally required for the formation of the same pattern. Further in the case where a feed movement of a given amount is repeated as when forming the shell pattern of FIG. 2, a program for reading the same feed data repeatedly is usable with this invention. This minimizes the amount of data required, permitting the use of a static memory of exceedingly smaller capacity than is heretofore possible. The pattern program shown in Table 7 for use in the system of this invention corresponds to the program shown in Table 14 below for use in electronic sewing machine of the conventional type described. The capacity of memory required in the latter case is: 153 (words) $\times 10$ bits = 1530 bits, hence a ROM of 256 (words) $\times 10$ bits, whereas Table 7 indicates that the present system requires a capacity of: 123 (words) 33 8 bits = 984 bits. Thus the data can be fully stored in a ROM of 128 (words) $\times 8$ bits. A memory of greatly reduced capacity is usable according to this invention, therefore.

Table 14

| No. | Address | Bight | Feed | Stitch pattern |
|---|---|---|---|---|
| 1 | 00000000 | 00000 | 11001 | Straight stitch |
| 2 | 00000001 | 11111 | 11111 | Straight stitch Return to 1 |
| 3 | 00000010 | 01111 | 11001 | Zigzag stitch |
| 4 | 00000011 | 11111 | 11001 | " |
| 5 | 00000100 | 11111 | 11111 | Zigzag stitch Return to 5 |
| 6 | 00000101 | 01111 | 10010 | Mending stitch |
| 7 | 00000110 | 00101 | 10010 | " |
| 8 | 00000111 | 10101 | 10010 | " |
| 9 | 00001000 | 11111 | 10010 | " |
| 10 | 00001001 | 10101 | 10010 | " |
| 11 | 00001010 | 00101 | 10010 | " |
| 12 | 00001011 | 11111 | 11111 | Mending stitch Return to 6 |
| 13 | 00001100 | 01111 | 11000 | Blind stitch |
| 14 | 00001101 | 11111 | 11000 | " |
| 15 | 00001110 | 11111 | 11000 | " |
| 16 | 00001111 | 11111 | 11000 | " |
| 17 | 00010000 | 11111 | 11000 | " |
| 18 | 00010001 | 11111 | 11000 | " |
| 19 | 00010010 | 11111 | 11000 | " |
| 20 | 00010011 | 11111 | 11000 | " |
| 21 | 00010100 | 11111 | 11111 | Blind stitch Return to 13 |
| 22 | 00010101 | 01100 | 00000 | Buttonhole stitch No. 1 |
| 23 | 00010110 | 11100 | 10001 | " |
| 24 | 00010111 | 01100 | 00000 | " |
| 25 | 00011000 | 11100 | 10001 | " |
| 26 | 00011001 | 01100 | 00000 | " |
| 27 | 00011010 | 11100 | 10001 | " |
| 28 | 00011011 | 01100 | 00000 | " |
| 29 | 00011100 | 00010 | 10001 | " |
| 30 | 00011101 | 00000 | 00000 | Buttonhole stitch No. 1 Return to 28 |
| 31 | 00011110 | 11100 | 00000 | Buttonhole stitch No. 2 |
| 32 | 00011111 | 01100 | 00001 | " |
| 33 | 00100000 | 11100 | 00000 | " |
| 34 | 00100001 | 01100 | 00001 | " |
| 35 | 00100010 | 11100 | 00000 | " |
| 36 | 00100011 | 01100 | 00001 | " |
| 37 | 00100100 | 11100 | 00000 | " |
| 38 | 00100101 | 10010 | 00001 | " |
| 39 | 00100110 | 00000 | 00000 | Buttonhole stitch No. 2 Return to 37 |
| 40 | 00100111 | 00000 | 11010 | Stretch stitch |
| 41 | 00101000 | 00000 | 11010 | " |
| 42 | 00101001 | 00000 | 01010 | " |
| 43 | 00101010 | 11111 | 11111 | Stretch stitch Return to 40 |
| 44 | 00101011 | 01111 | 11010 | Feather stitch |
| 45 | 00101100 | 00101 | 11010 | " |
| 46 | 00101101 | 10101 | 10010 | " |
| 47 | 00101110 | 11111 | 11010 | " |
| 48 | 00101111 | 10101 | 11010 | " |
| 49 | 00110000 | 00101 | 01010 | " |
| 50 | 00110001 | 11111 | 11111 | Feather stitch Return to 44 |
| 51 | 00110010 | 01111 | 11010 | Smocking stitch |
| 52 | 00110011 | 00101 | 01010 | " |
| 53 | 00110100 | 10101 | 11010 | " |
| 54 | 00110101 | 11111 | 11010 | " |
| 55 | 00110110 | 10101 | 01010 | " |
| 56 | 00110111 | 00101 | 11010 | " |
| 57 | 00111000 | 11111 | 11111 | Smocking stitch Return to 51 |
| 58 | 00111001 | 11111 | 11010 | Hemstitch |
| 59 | 00111010 | 01111 | 01010 | " |
| 60 | 00111011 | 01111 | 11010 | " |
| 61 | 00111100 | 01111 | 11010 | " |
| 62 | 00111101 | 01111 | 01010 | " |
| 63 | 00111110 | 01111 | 11010 | " |
| 64 | 00111111 | 11111 | 11111 | Hemstitch Return to 58 |
| 65 | 01000000 | 01111 | 10001 | Shell pattern |
| 66 | 01000001 | 00101 | 10001 | " |
| 67 | 01000010 | 01011 | 10001 | " |
| 68 | 01000011 | 10100 | 10001 | " |
| 69 | 01000100 | 00111 | 10001 | " |
| 70 | 01000101 | 11000 | 10001 | " |
| 71 | 01000110 | 00100 | 10001 | " |
| 72 | 01000111 | 11011 | 10001 | " |
| 73 | 01001000 | 00010 | 10001 | " |
| 74 | 01001001 | 11101 | 10001 | " |
| 75 | 01001010 | 00000 | 10001 | " |
| 76 | 01001011 | 11110 | 10001 | " |
| 77 | 01001100 | 10001 | 10001 | " |
| 78 | 01001101 | 11111 | 10001 | " |
| 79 | 01001110 | 10001 | 10001 | " |
| 80 | 01001111 | 11111 | 10001 | " |
| 81 | 01010000 | 10001 | 10001 | " |
| 82 | 01010001 | 11111 | 10001 | " |
| 83 | 01010010 | 10001 | 10001 | " |
| 84 | 01010011 | 11110 | 10001 | " |
| 85 | 01010100 | 00000 | 10001 | " |
| 86 | 01010101 | 11101 | 10001 | " |
| 87 | 01010110 | 00010 | 10001 | " |
| 88 | 01010111 | 11011 | 10001 | " |
| 89 | 01011000 | 00100 | 10001 | " |
| 90 | 01011001 | 11000 | 10001 | " |
| 91 | 01011010 | 00111 | 10001 | " |
| 92 | 01011011 | 10100 | 10001 | " |
| 93 | 01011100 | 01011 | 10001 | " |
| 94 | 01011101 | 00101 | 10001 | " |
| 95 | 01011110 | 11111 | 11111 | Shell pattern Return to 65 |
| 96 | 01011111 | 01111 | 10001 | Satin stich |
| 97 | 01100000 | 00101 | 10001 | " |
| 98 | 01100001 | 01111 | 10001 | " |
| 99 | 01100010 | 00101 | 10001 | " |
| 100 | 01100011 | 01111 | 10001 | " |
| 101 | 01100100 | 00101 | 10001 | " |
| 102 | 01100101 | 10101 | 10001 | " |
| 103 | 01100110 | 00101 | 10001 | " |
| 104 | 01100111 | 10101 | 10001 | " |
| 105 | 01101000 | 00101 | 10001 | " |
| 106 | 01101001 | 10101 | 10001 | " |
| 107 | 01101010 | 00101 | 10001 | " |
| 108 | 01101011 | 10101 | 10001 | " |
| 109 | 01101100 | 11111 | 10001 | " |
| 110 | 01101101 | 10101 | 10001 | " |
| 111 | 01101110 | 11111 | 10001 | " |
| 112 | 01101111 | 10101 | 10001 | " |
| 113 | 01110000 | 11111 | 10001 | " |
| 114 | 01110001 | 10101 | 10001 | " |
| 115 | 01110010 | 00101 | 10001 | " |
| 116 | 01110011 | 10101 | 10001 | " |
| 117 | 01110100 | 00101 | 10001 | " |
| 118 | 01110101 | 10101 | 10001 | " |
| 119 | 01110110 | 00101 | 10001 | " |
| 120 | 01110111 | 10101 | 10001 | " |
| 121 | 01111000 | 00101 | 10001 | " |
| 122 | 01111001 | 11111 | 11111 | Satin stitch Return to 96 |
| 123 | 01111010 | 01111 | 11000 | Tulip pattern |
| 124 | 01111011 | 01111 | 11000 | " |
| 125 | 01111100 | 01111 | 11000 | " |
| 126 | 01111101 | 01111 | 01000 | " |
| 127 | 01111110 | 01011 | 00110 | " |
| 128 | 01111111 | 00111 | 00011 | " |
| 129 | 10000000 | 00011 | 11000 | " |
| 130 | 10000001 | 00111 | 11010 | " |
| 131 | 10000010 | 01011 | 00000 | " |
| 132 | 10000011 | 00011 | 00101 | " |
| 133 | 10000100 | 00001 | 00011 | " |
| 134 | 10000101 | 10011 | 00010 | " |
| 135 | 10000110 | 11001 | 10011 | " |
| 136 | 10000111 | 11111 | 10011 | " |
| 137 | 10001000 | 11001 | 10110 | " |
| 138 | 10001001 | 11111 | 10110 | " |
| 139 | 10001010 | 11001 | 10011 | " |
| 140 | 10001011 | 11111 | 10011 | " |
| 141 | 10001100 | 11001 | 00010 | " |
| 142 | 10001101 | 10011 | 00011 | " |
| 143 | 10001110 | 00001 | 00101 | " |
| 144 | 10001111 | 00011 | 00000 | " |
| 145 | 10010000 | 01011 | 11010 | " |
| 146 | 10010001 | 00111 | 11000 | " |
| 147 | 10010010 | 00011 | 00011 | " |
| 148 | 10010011 | 00111 | 00110 | " |
| 149 | 10010100 | 01011 | 01000 | " |
| 150 | 10010101 | 01111 | 11000 | " |
| 151 | 10010110 | 01111 | 11000 | " |
| 152 | 10010111 | 01111 | 11000 | " |
| 153 | 10011000 | 11111 | 11111 | Tulip pattern Return to 123 |

What is claimed is:

1. In an electronic sewing machine in which the information relating to the stitching needle movement and to the feeding dog movement are stored in a static memory, is read out in timed relation to the rotation of the machine main shaft and is fed to drive means for controlling the amount and direction of the stitching and feeding movements to form stitch patterns, a system for generating stitch pattern signals comprising:
   a static memory storing output data relating to the amount of bight or feed and storing order instructing data specifying the order in which the output data is to be read out, the output data and order instructing data being arranged in the static memory as bight relating data and feed relating data,
   a pattern selecting unit for giving output address signals for accessing head data of a predetermined pattern forming program from the data stored in the static memory when operated by a machine operator,
   a temporary memory for temporarily storing the output data read out from the static memory until the next output data is received and for transferring the stored output data to a pattern control unit for directly controlling the stitching needle movement and the feeding dog movement,
   a control unit for receiving the output signal read out from the static memory and an address signal for specifying the address of the output signal, and the control unit including means for supplying to an address unit the address signal to be subsequently fed to the static memory, the control unit further including means for producing control signals for controlling the operation timing of the components of the system,
   an address unit for temporarily storing the address signal to be used for the next address specification and which is received directly from the control unit or is prepared by the address unit in response to a control signal from the control unit, the address signal being stored until the next stitching movement or feeding movement is performed,
   a reference signal generator for giving the control unit reference status signals for the control signals to be given by the control unit to the components, and
   a timing pulse generator for feeding bight and feed timing signals to the control unit in timed relation to the rotation of the machine main shaft to cause the control unit to control the data to be produced from the address unit and the data to be produced from the temporary memory, alternately with respect to the bight and feed data.

2. A system as defined in claim 1 wherein the control unit includes a memory control circuit for causing the alternate feeding of the bight and feed data, the memory control circuit being resettable to render a timing signal effective at a start point in the order of timing signals to be given by the program stored in the static memory, during a series of operations in which the pattern selecting unit is operated to renew the kind of pattern, the memory control circuit including means for selectively rendering effective one of bight and feed timing signals in connection with the preceding timing signal and to give a control signal to the address unit, the memory control circuit further including means for memorizing which of the timing signals has been fed.

3. A system as defined in claim 1 wherein the pattern selecting unit includes address signal generator means for giving address data for the head data of the stitch patterns as divided with respect to bight relating data and feed relating data, the address signal generator means being responsive to a specified pattern selecting signal to give an address data output corresponding to the head data of the pattern concerned.

4. A system as defined in claim 1 wherein the temporary memory unit comprises an output register for temporarily storing the data relating to the stitching movement and read out from the static memory and an output register for temporarily storing the data relating to the feeding movement and read out from the static memory, the output registers being responsive to the control signals from the control unit to give outputs of the stored data alternatively in timed relation to the stitching movement and feeding movement respectively.

5. A system as defined in claim 1 wherein the control unit comprises jump means for subjecting the address data for accessing the static memory and the data specified by the address data and read out from the static memory to addition or subtraction and transferring to the address unit the address data to be subsequently fed, a decoder for decoding the order instructing data read out from the static memory and giving a specified instruction signal output, and bight and feed status counters for extracting from the order instructing data the number of times the transfer of the address data must be made from the jump means to the address unit and storing the number of times of the data transfer.

6. A system as defined in claim 1 wherein the control unit is connected to an initial resetting circuit for resetting the control unit for an initial state and to a straight stitch forming operation selecting line of the pattern selecting unit, the control unit being responsive to a signal from the initial resetting circuit to select the straight stitch operation and bring the address unit into an initial state for the straight stitch formation.

7. A system as defined in claim 1 wherein the control unit comprises a first memory control circuit for preventing a sequential pattern information output operation until a sequential pattern selecting operation for retrieving the head data of the pattern has been completed in response to a pattern selecting action of the operator and a second memory control circuit for confirming that the pattern selecting operation has been initiated and holding the first memory control circuit out of operation until the operator renews the pattern, the control unit being operable to initiate the pattern information output operation immediately after the completion of the pattern selecting operation.

8. A system as defined in claim 1 wherein the address unit comprises input register means for temporarily storing the head address data from the pattern selecting unit as divided into bight relating data and feed relating data and a program counter for temporarily storing the address data from the input register means or the control unit and transferring the address data to the input register means or to a subsequent address register in response to a control signal from the control unit.

* * * * *